United States Patent
Khosrowpour et al.

(10) Patent No.: US 11,645,037 B2
(45) Date of Patent: May 9, 2023

(54) ADJUSTING AUDIO VOLUME AND QUALITY OF NEAR END AND FAR END TALKERS

(71) Applicant: Dell Products L.P., Round Rock, TX (US)

(72) Inventors: Farzad Khosrowpour, Pflugerville, TX (US); Douglas Peeler, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 69 days.

(21) Appl. No.: 17/160,141

(22) Filed: Jan. 27, 2021

(65) Prior Publication Data
US 2022/0236946 A1    Jul. 28, 2022

(51) Int. Cl.
*G06F 3/16* (2006.01)
*G06N 20/00* (2019.01)

(52) U.S. Cl.
CPC ............. *G06F 3/167* (2013.01); *G06F 3/165* (2013.01); *G06N 20/00* (2019.01)

(58) Field of Classification Search
CPC .......... G06F 3/167; G06F 3/165; G06N 20/00
See application file for complete search history.

(56) References Cited

U.S. PATENT DOCUMENTS

| | | | |
|---|---|---|---|
| 2011/0300806 A1* | 12/2011 | Lindahl | G10L 21/0208 455/63.1 |
| 2018/0167515 A1* | 6/2018 | Shi | H04M 3/568 |
| 2019/0082145 A1* | 3/2019 | McArdle | H04N 7/147 |
| 2019/0156847 A1* | 5/2019 | Bryan | G10L 21/0232 |

* cited by examiner

*Primary Examiner* — Fan S Tsang
*Assistant Examiner* — David Siegel
(74) *Attorney, Agent, or Firm* — Jackson Walker L.L.P.

(57) ABSTRACT

An orchestrator associated with a collaboration application client executed by a near end device dynamically adapts volume level and/or other audio quality parameters to deliver a consistent voice experience to a collaboration participant. The orchestrator is informed by multiple machine learning engines collecting and analyzing inputs from one or more existing sensor-based functions embedded in the near end device. The orchestrator determine an audio configuration of the device and audio preferences of the user. Identities of far end participants are determined and their profiles are mapped against the user volume preferences. The orchestrator functions as an informing agent to the audio signal processing engine of the device, managing speaker output volume and microphone gain settings, based upon the machine learning engines and the sensor-based functions. The sensor based functions may detect proximity, head pose, gaze point, eye position, facial identities, mood, and so forth.

20 Claims, 7 Drawing Sheets

ADJUSTING AUDIO VOLUME AND QUALITY OF NEAR END AND FAR END TALKERS

TECHNICAL FIELD

The present disclosure relates to collaboration applications and, more specifically, audio quality experienced by users of collaboration applications.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are frequently employed to engage in distanced collaboration sessions in which one or more attendees at each of two or more distinct locations invoke a collaboration application program such as Zoom, Microsoft Teams, or the like to establish a shared communication link, which typically includes an audio component and frequently including a video component.

The sound level and quality experienced between different collaboration software applications varies noticeably. The factors affecting the quality of the audio experience include: variations in the devices used to join the collaboration application, different room settings for the one or more far end talkers as well as the near end user, variations in talker volume, pitch, etc., varying number of attendees, different and often changing positions of talkers relative to microphone or speaker, different volume level management techniques employed by different collaboration applications. Users desire a smooth and level volume from all attendees irrespective of these and other variables.

SUMMARY

In accordance with the teachings of the present disclosure, problems associated with audio quality experienced by users of collaboration applications is reduced or eliminated by one or more disclosed methods of adjusting and enhancing audio volume and/or one or more other audio signal parameters. A disclosed software module referred to herein as an orchestrator, combines one or more machine learning functions, modules, or engines with one or more sensor-based functions to automatically detect, identify, and learn voice characteristics of attendees and their corresponding preferences and to uniquely adapt volume level and other audio quality parameters to deliver a consistent voice experience to each user. The orchestrator serves as the informing agent to the audio signal processing engine of the user's device based upon the combined inputs from the machine learning engines and the sensor-based functions. The orchestrator beneficially utilizes one or more pre-existing system capabilities including, as non-limiting examples, capabilities for proximity detection, head tracking, eye gaze, facial recognition and facial identification, and so forth.

In at least one embodiment, the orchestrator is configured to access or generate profiles of one or more attendees of the collaboration session. Disclosed systems may access or employ one or more machine learning engines for aggregating attendee profile information and mapping the information against user volume level preferences. This intelligence may be augmented with information from client-based sensors and sensor functions embedded in the user's device, including, without limitation, proximity sensors, eye track sensors, head angle sensors, and so forth. The aggregate of all learned and sensed intelligence drive a common layer of control in the form of the orchestration module managing speaker output volume and microphone gain settings.

The orchestrator may support two or more optimization phases, each of which may be associated with particular functions. As a non-limiting example, an exemplary orchestrator may support a start phase, a detect phase, a discovery phase, a profile phase, and an action phase.

The orchestrator application may monitor inputs from one or more embedded sensors and sensor functions within the user's device and one or more machine learning engines to seamlessly and dynamically adjust one or more audio parameters including but not limited to volume level. In this manner, the orchestrator presents the user with smooth and level audio despite variations in one or more audio-relevant parameters. In at least some embodiments, the types of variation that the orchestrator may encounter and combat include, without limitation, loud and soft spoken speakers, variations in the number of participants, variations in the acoustic parameters of the room or environment from which each participant joins the collaboration session, variations in the position of the user with respect to the applicable microphone and audio speaker, variations in level management techniques between or among two or more collaboration applications.

Subject matter included herein discloses an orchestrator software module, associated with a collaboration application client executed by a near end device, which dynamically characterizes near and far end volumes levels and dynamically adapts near end volume level and/or other audio quality parameters to deliver a consistent voice experience to a collaboration participant. The orchestrator is informed by multiple machine learning engines collecting and analyzing inputs from one or more existing sensor-based functions embedded in the near end device. The orchestrator determine an audio configuration of the device and audio preferences of the user. Identities of far end participants are determined and their profiles are mapped against the user volume preferences. The orchestrator functions as an informing agent to the audio signal processing engine of the device, managing speaker output volume and microphone gain settings, based upon the machine learning engines and the sensor-based functions. The sensor based functions may detect proximity, head pose, gaze point, eye position, facial identities, mood, and so forth.

Technical advantages of the present disclosure may be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-7, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network data storage device, or any other suitable device and may vary in size, shape, performance, functionality, and price. The information handling system may include memory, one or more processing resources such as a central processing unit (CPU) or hardware or software control logic. Additional components of the information handling system may include one or more data storage devices, one or more communications ports for communicating with external devices as well as various input and output (I/O) devices, such as a keyboard, a mouse, and a video display. The information handling system may also include one or more buses operable to transmit communication between the various hardware components.

In this disclosure, the term "information handling resource" may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

Figure 1:
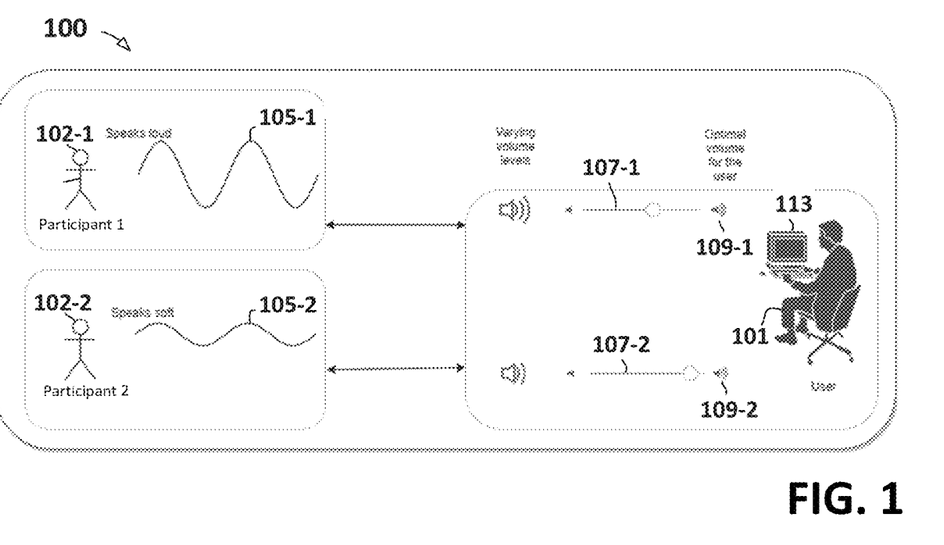
FIG. 1 illustrates a collaboration session including far end participants with different speech characteristics.
Figure 2:
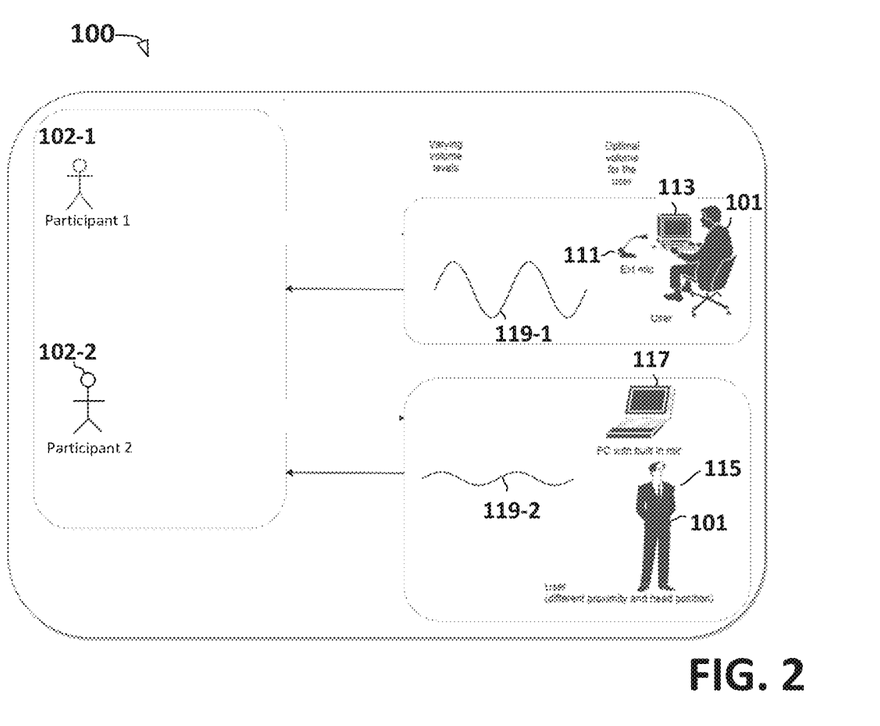
FIG. 2 illustrates a near end user changing positions and devices within a single collaboration session or between different sessions.

Referring now to the drawings, FIG. 1 and FIG. 2 illustrate examples of undesirable audio inconsistency and variability associated with collaboration applications. The illustrated examples are representative of audio issues addressed by an information handling resource disclose and referred to herein as the collaboration session orchestrator or, more simply, the orchestrator. FIG. 1 illustrates an example collaboration session 100 including a near end participant 101, also referred to herein as near end user 101, seated in front of a desktop computer 113, and two far end participants 102-1 and 102-2, also referred to herein as far end talkers or far end speakers. As depicted in FIG. 1, first far end participant 102-1 has a comparatively loud speaking voice, as conveyed by the comparatively large amplitude of the representative sound wave 105-1, while second far end participant 102-2 has a comparatively soft or quiet speaking voice, as conveyed by the comparatively small amplitude of the representative sound wave 105-2. FIG. 1 further illustrates the near end user's optimal volume levels 107-1 and 107-2 for these two far end speakers. In this context, optimal volume levels 107 represent volume levels that produce corresponding audible outputs 109 that are, from the perspective of near end user 101, level or uniform across both far end speakers and optimal with respect to the near end user's personal preferences.

FIG. 2 illustrates near end user 101 speaking from a seated position in front of a desktop computer device 113 and in close proximity to an external microphone 111 during a collaboration session. FIG. 2 further illustrates near end user 101 speaking from a standing position 115 at some distance from a mobile computer 117, e.g., a laptop or surface device, during a different collaboration session or at a different time of the same collaboration session. Under the illustrated conditions, external microphone 111 and a built in microphone (not explicitly depicted) in mobile computer 117 respectively generate first and second audio signals 119-1 and 119-2 corresponding to the near end users voice. FIG. 2 emphasizes that the amplitude of first audio signal 119-1 is considerably different and larger than the amplitude of second audio signal 119-2 and it will be readily appreciated that this variation will be detectable to far end participants.

For the sake of clarity and brevity, the sources of audio quality variability emphasized in FIG. 1 and FIG. 2 are merely examples and those of ordinary skill in the field of collaboration solutions will recognize that there are many other sources of variability. An orchestrator disclosed herein and described in more detail below monitors one or more sensor-based and machine-derived inputs to detect and compensate for all such sources of audio quality variability. The orchestrator beneficially utilizes intelligence functionality including, without limitation, proximity detection, head tracking, eye gaze, facial recognition, etc., that is substantially or entirely pre-existing in the devices typically used to by collaboration session participants, but as the informing agent for a device's audio signal processing resources, the specific combinations of sensor-based and machine learning inputs assessed by the orchestrator are unique and unprecedented.

Figure 3:
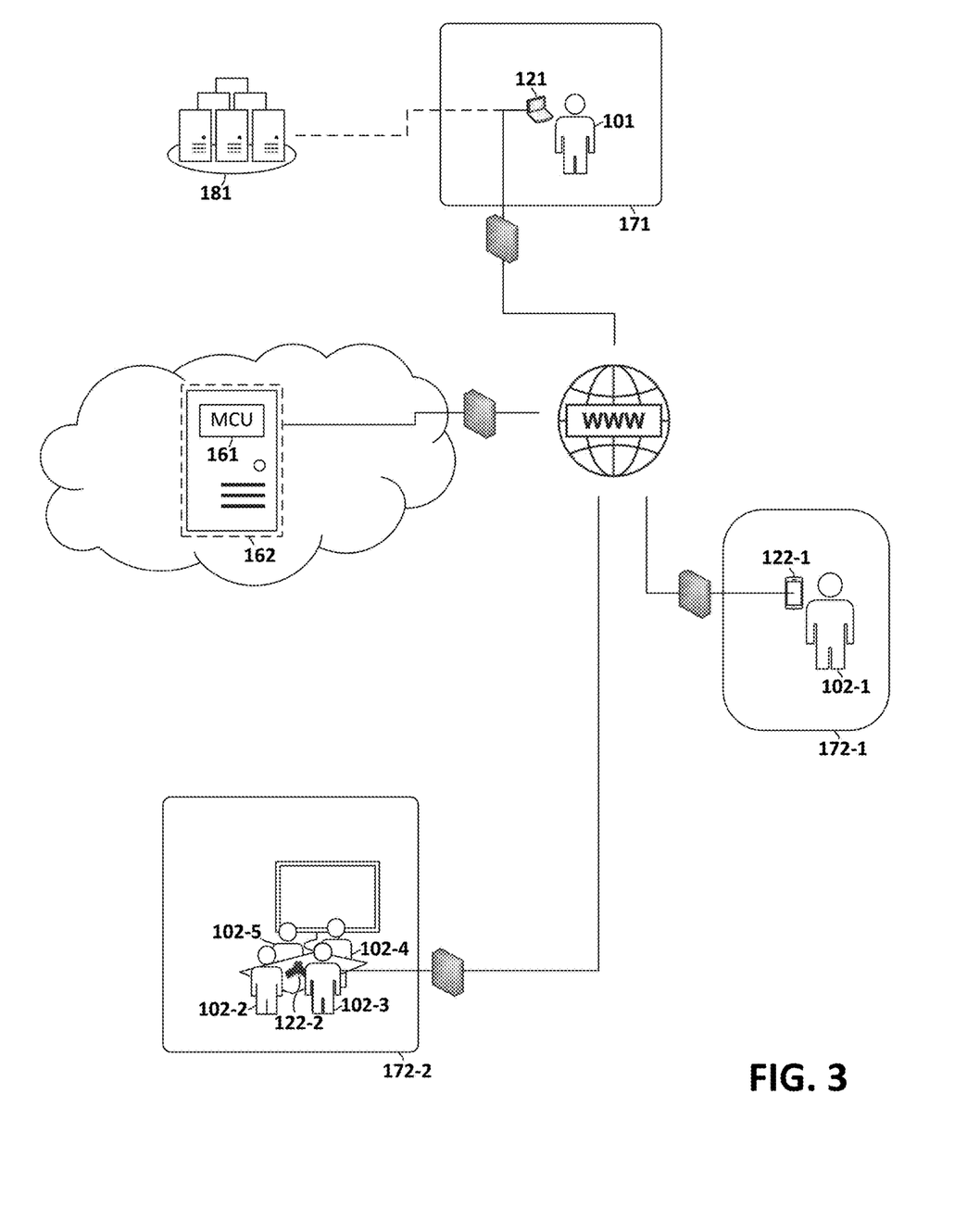
FIG. 3 illustrates elements of an exemplary collaboration session.

Referring now to FIG. 3, resources employed in an exemplary collaboration session 100 are illustrated. For the sake of clarity, the collaboration session 100 illustrated in FIG. 3 has just three participants or, more specifically, three participant locations, each of which includes one or more participants, but those of ordinary skill will appreciate that the concepts disclosed herein are readily scalable and that the number of participants and participant locations can be considerably larger than the three locations of FIG. 3.

The illustrated collaboration session 100 includes a near end collaboration device 121-1 associated with a near end user 101 located at near end location 171, a first far end collaboration device 122-1 associated with a first far end user 102-1 located at a first far end location 171-1, and a second far end collaboration device 122-2 associated with a group of four far end users 102-2 through 102-5 located at a second far end location 172-2. Collaboration devices 121 and 122 are information handling systems that include or have access to capabilities and hardware resources for generating, encoding, and transmitting audio signals and receiving, decoding, and rendering audio and video signals. Collaboration devices 121 and 122 are typically web-capable devices configured to support point-to-point and multipoint audio-visual sessions in compliance with one or more standards and/or protocols for networked communication of audio-video content including, as two pervasive but non-limiting examples, H.323 and Session Initiation Protocol (SIP). Collaboration devices 121 and 122 may be implemented with any of a variety of information handling system types including, as non-limiting examples, smart phones, tablets, laptop and desktop computers, hybrid devices including Microsoft Surfaces devices, gaming controllers, docking stations, dedicated conference phones and audio/video bars, in combination with one or more large screen monitors, and so forth. Many information handling systems suitable for use as a collaboration device include or support functions, features, and resources, discussed in more detail below with respect to FIG. 4, that are utilized for audio quality leveling as disclosed herein.

In at least one embodiment, each collaboration device 121 and 122 executes a collaboration client (not explicitly depicted in FIG. 3) to connect with a virtualized collaboration server 162 associated with a collaboration service provider. Among many other features and functions, including call control and security, collaboration sever 162 includes a multipoint control unit (MCU) 231 to receive audio and video content signals from each collaboration device and return a mixed audio signal one or more mixed and/or switched video signals to each collaboration device so that each participant hears a composite audio signal of all speakers and sees one or more of the other participants including the active speaker.

As depicted in FIG. 3, collaboration device 121 is communicatively coupled to one or more functions, modules, engines, or resources generically referred to herein as machine learning engine(s) 181. In at least some embodiments, volume level control information may be generated based on the usage parameters, including as a non-limiting example, volume changes performed by the user during other collaboration sessions, using artificial intelligence and/or machine learning algorithms, such as supervised, unsupervised, or reinforcement training algorithms, to analyze the usage parameters and determine volume level control information that will enhance system performance. A machine learning engine may use algorithms to identify relationships between user-initiated changes in the user's volume level and one or more other parameters, conditions, or states relevant to the collaboration session. To illustrate, machine learning engines may determine, perhaps not surprisingly, a correlation between the volume level selected by the user and any one or more of the following illustrative factors or parameters: the user's proximity, gaze point, head pose etc. relative to the user's device, the number of attendees at one or more of far end locations, the type of room or environment associated with the location of the user or one or more of the far end locations; whether the user employed a headset during the session and/or participated via smart phone; bandwidth and/or noise parameters associated with the user's network connection, the time of day, day of week, room temperature and humidity, and so forth, and determine volume level control information that will improve the uniformity of the volume experienced by the user. In some embodiments, a rule-based engine may be used alone or in combination with other algorithms for determining volume level control information. After any volume level control information is determined, the information may be distributed to one or more of the users.

Volume level control information may be generated through the application of optimization algorithms, such as machine learning and/or artificial intelligence algorithms. The optimization algorithms may make use of usage parameters and corresponding volume level control information, previously generated and/or received from other information handling systems, in generating volume level control information based on the received usage parameters. For example, machine learning and/or artificial intelligence algorithms may be used to analyze combinations of stored usage and volume level control information to determine ways in which adjustments have caused improvements in system performance, which may be indicated by changes in usage parameters following adjustment of volume level control information.

Audio leveling described herein does not impose any requirements on the collaboration service, but may use, access, or otherwise leverage services and features that are provided. As an example, if the service displays the active speaker, this feature might be used in conjunction with facial recognition capabilities resident on at least some of the collaboration devices to identify the participants on a call and, perhaps more significantly with respect to the audio quality issues addressed by disclosed subject matter, identify the talking participants.

Figure 4:
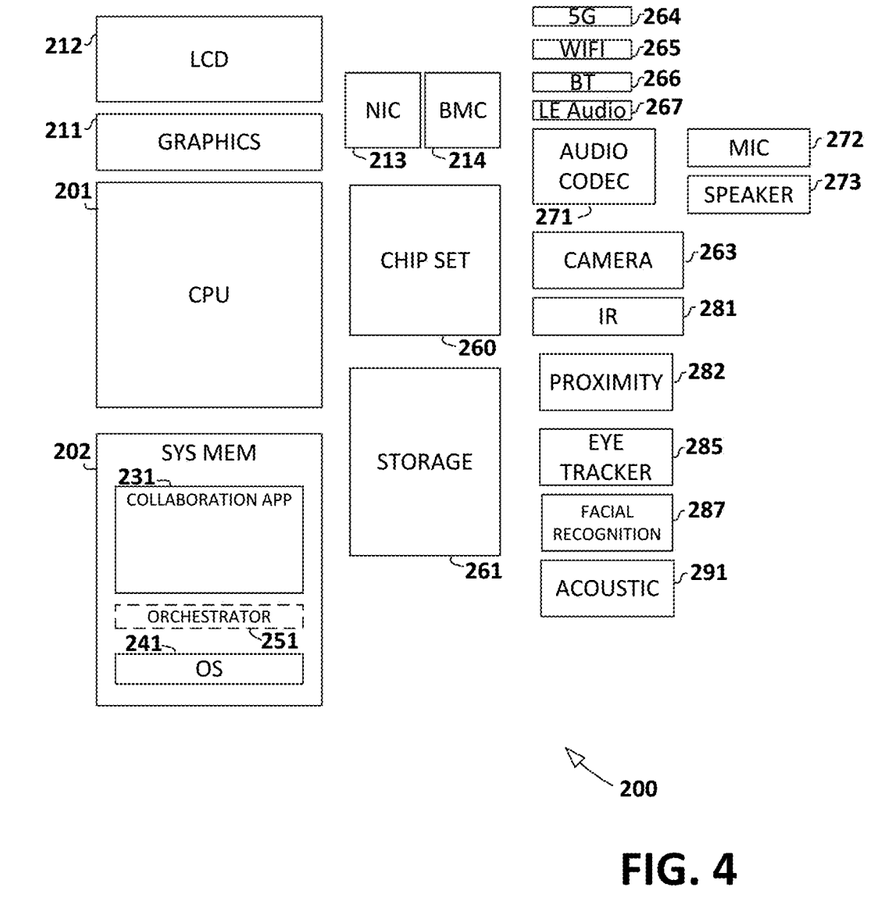
FIG. 4 illustrates an information handling system suitable for establishing and maintaining a collaboration session.

Referring now to FIG. 4, a block diagram of an information handling system 200 suitable for use as the collaboration device 221 illustrated in FIG. 3 is presented. Although the information handling system 200 illustrated in FIG. 4 includes elements that may be associated with a laptop or desktop computer, disclosed audio leveling features may be beneficially included in other types of information handling systems and those of ordinary skill in the field of electronic devices will readily appreciate that the depicted system is exemplary and that other devices, not explicitly illustrated in FIG. 4, including smart phones, tablets, hybrid devices, and dedicated video/conferencing devices. It will be further appreciated that, for the sake of clarity and brevity, many elements and components of information handling system 200 have been omitted from the depiction in FIG. 4.

The information handling system 200 illustrated in FIG. 4 includes a general purpose processor or central processing unit (CPU) 201 communicatively coupled to various peripheral devices generically referred to herein as information handling resources. The information handling resources illustrated in FIG. 4 include a system memory 202 suitable for storing data (not explicitly depicted in FIG. 1) intended for and/or generated by CPU 201 as well as computer executable instructions, sometimes referred to as programs, applications, and the like, for performing specific tasks and functions.

The programs residing in the system memory 202 illustrated in FIG. 4 include an operating system 203 which manages system resources and provides a functional platform for CPU 201 to execute application programs. The applications programs residing in the system memory 202 illustrated in FIG. 4 include a collaboration application client referred to herein as collaboration application 231 and an orchestrator program 251 for implementing audio leveling in conjunction with the collaboration application 231.

For the sake of clarity, many other programs executed by CPU 201, all or portions of which may be stored in system memory 202, are omitted from FIG. 4.

In at least one embodiment, orchestrator application 204 monitors inputs from one or more sensors and one or more machine learning engines that may be germane to the audio quality experienced by a participant of a collaboration session accessed via collaboration application 231 to seamlessly and dynamically adjust one or more audio parameters including but not limited to volume. In this manner, orchestrator 251 presents the user with smooth and level audio despite variations in one or more audio-relevant parameters. In at least some embodiments, the types of variation that orchestrator 251 may encounter and combat include, without limitation, loud and soft spoken speakers, variations in the number of participants, variations in the acoustic parameters of the room or environment from which each participant joins the collaboration session, variations in the position of the user with respect to the applicable microphone and audio speaker, variations in level management techniques between or among two or more collaboration applications.

The information handling system 200 of FIG. 4 further includes a graphics module 211 to process video information and render video on a display device such as the liquid crystal display (LCD) 212 and a chipset 220 to communicatively couple various peripheral devices to CPU 201. A network interface card (NIC) 213 supports Ethernet or another suitable broadband network connection. A baseboard management controller (BMC) 214 facilitates and supports external management of information handling system 200. The peripheral devices coupled to CPU 201 via chip set 260 include storage resources 261, camera 263, radio/transceiver resources 264-267 supporting various wireless communication transports and protocols, an audio codec 271 coupled to a microphone 272 and speakers 273, and an IR transceiver 281.

The information handling system 200 illustrated in FIG. 4 includes one or more sensors and/or sensed functions which may be utilized by orchestrator 251. The sensed functions illustrated in FIG. 4 include a proximity detector 282, eye tracker 285, facial recognition module 287, and an acoustic resource 291. Eye tracker 285 may support monitoring and determination of eye position, gaze direction, and head pose, as non-limiting examples. Acoustic modules 291 may be used in conjunction with microphone 272 to measure the spectral content and other characteristics of a talker and determine the echo characteristics of a room or environment by, for example, determining an RT60 value or another reverberation time parameter for a room.

Figure 5:
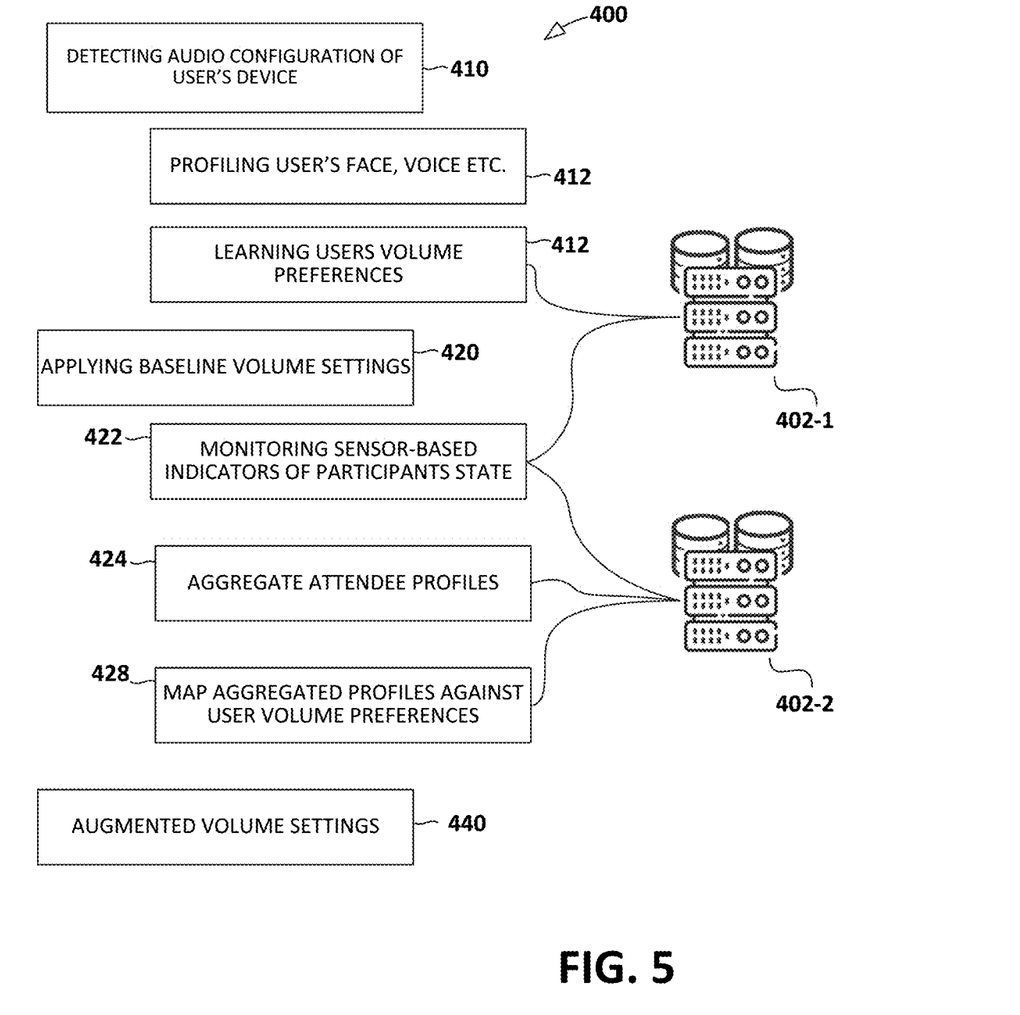
FIG. 5 illustrates a flow diagram of an exemplary audio control method.

Referring now to FIG. 5, a flow diagram illustrates an exemplary audio parameter control method 400 performed by orchestrator 251 in conjunction with one or more machine learning engines 402, two of which are illustrated in FIGS. 5 (402-1 and 402-2). Although method 400 encompasses the control of any suitable audio signal parameter, for the sake of brevity and clarity, the illustrated method is explained with respect to volume as the most readily familiar audio parameter.

Figure 6:
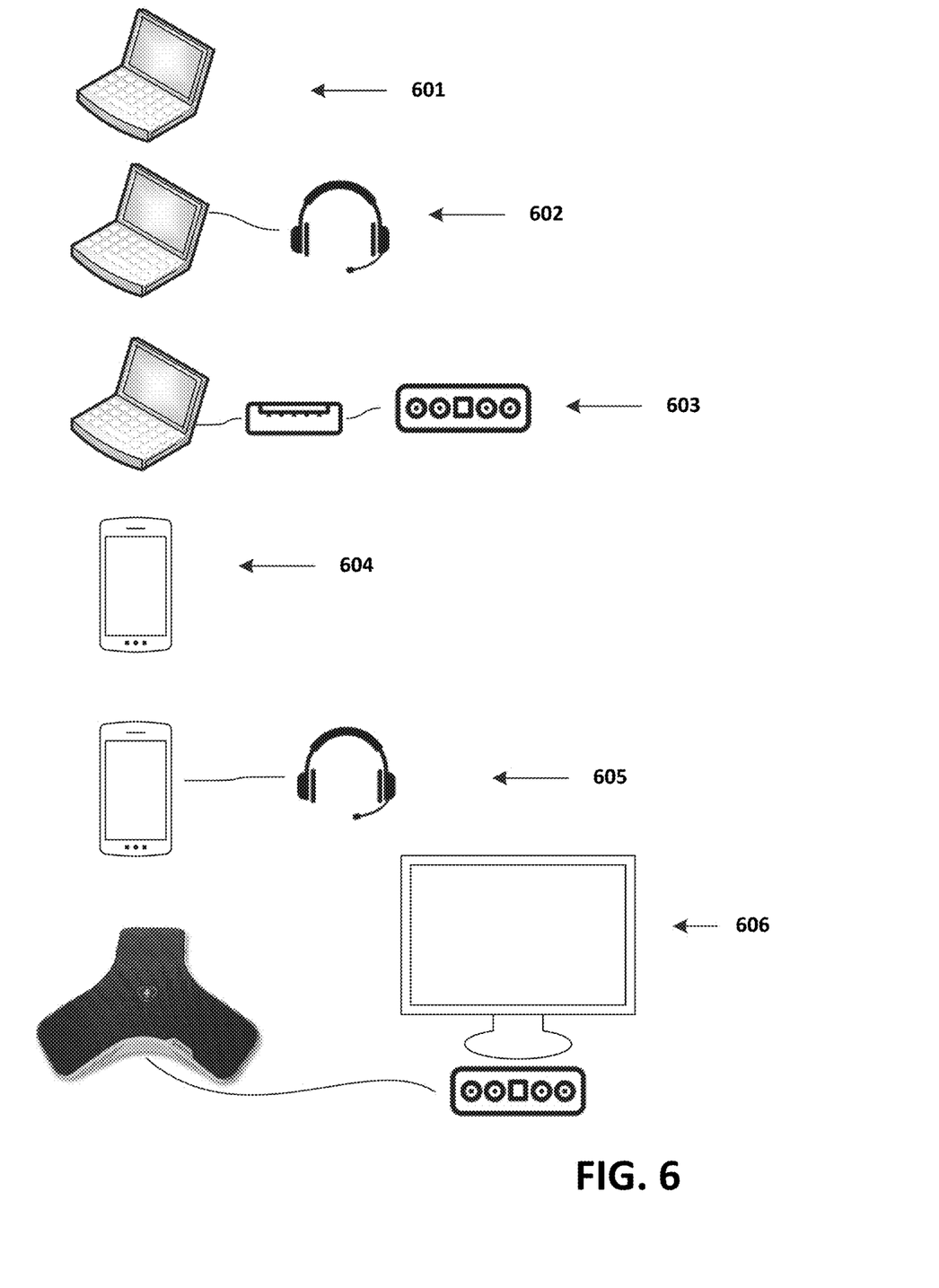
FIG. 6 illustrates exemplary user device configurations a single participant might employ over time.

As illustrated in FIG. 5, method 400 includes detecting (410) an audio configuration of the user's collaboration device, i.e., the information handling system resources employed by the user to participate in the collaboration session. Referring briefly to FIG. 6, various exemplary collaboration device configurations are illustrated. The illustrated collaboration devices configurations include a first configuration 301 comprising a stand-alone laptop or desktop computer, a second configuration 602 comprising a, a laptop/desktop computer in combination with a Bluetooth headset, a third configuration 603 comprising a laptop computer coupled to a docking station and sound bar, a fourth configuration comprising a stand-alone smart phone, tablet, other suitable mobile device, a fifth configuration 605 comprising a mobile device in combination with a Bluetooth headset, and a six configuration, suitable for a conference room or the like, comprising a dedicated tabletop microphone array in combination with a sound bar and large screen flat panel display. Each configuration features a different path for rendering audio and capturing microphone input. In at least some embodiments, orchestrator 251 may capture the user device configuration based via APIs (e.g., MIPI, ACPI and other standard methods).

Method 400 includes profiling (412) the users characteristics (e.g., face ID, spectral content of voice, etc.) and observing and learning (414) the user's volume preferences. Based on the user device configuration and the user's profile and volume preferences, the orchestrator applies (420).

The method 400 illustrated in FIG. 5 further includes ongoing monitoring (422) of sensor based indicators of the user's presence and state within the collaboration session and with respect to the audio-significant elements of the user's device configuration (e.g., the user's position with respect to the applicable microphone and speakers as determined by one or more existing capabilities of intelligence in the user device (e.g., proximity detection, head tracking, eye gaze, face ID, etc.)

One or more machine learning engines 402 may aggregate (424) attendee profiles, map (428) them against preferred user volume, combined with the user profiling obtained by monitoring (422) embedded client based sensors (like proximity sensing and eye track/head angle). Method 400 aggregates these inputs via a common layer of control through an orchestration layer to augment (430) output volume and microphone gain settings.

Method 400 can function independent of the collaboration software and learns/adapts to the uniqueness of the hardware configuration and user environment. The audio signals captured by the microphones or rendered on the loudspeakers are modified via client-based processing that is informed by the machine learning engines' outputs. Method 400 will also learn which collaboration app is being used and updates preferences and volume adjustments associated with each app.

Figure 7A:
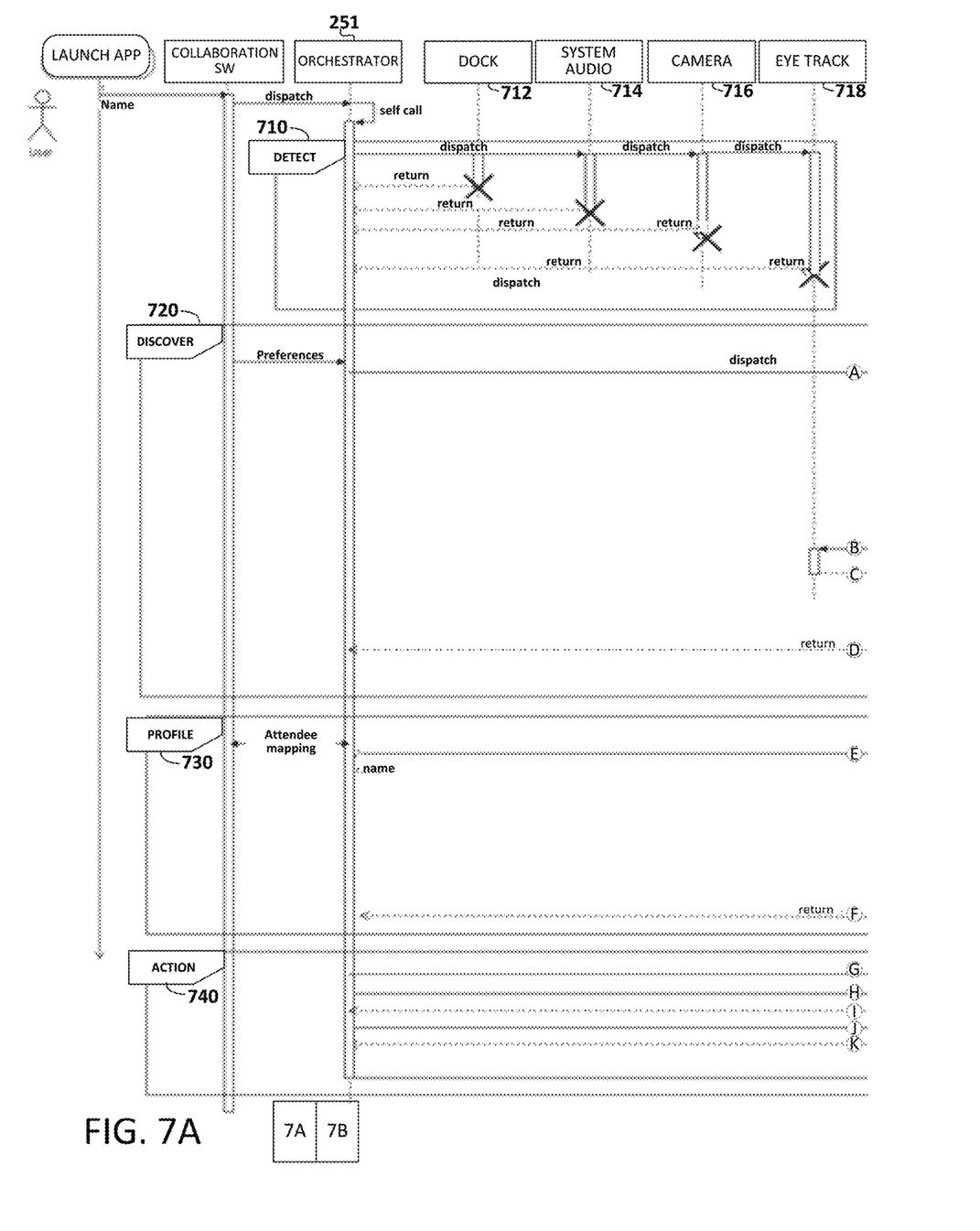
FIGS. 7A and 7B illustrate a sequence diagram of a method for controlling one or more audio parameters.
Figure 7B:
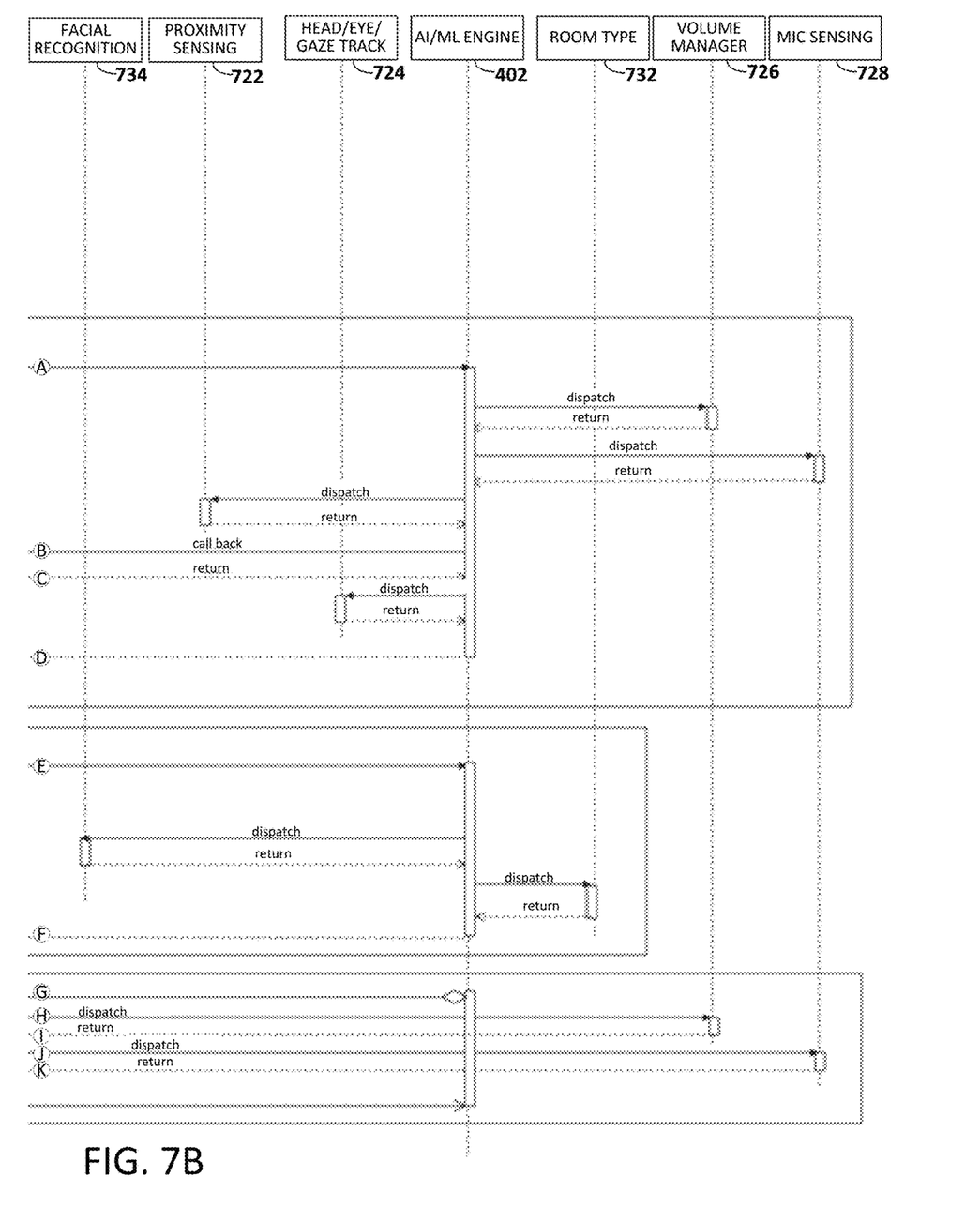

Referring now to FIGS. 7A and 7B, aspects of the method 400 illustrated in FIG. 6 are illustrated in sequence diagram 700. Sequence diagram 700 identifies four primary phases of interaction between and among the illustrated resources. During detection phase 710, orchestrator 251 detects the user's configuration which may include a dock 712, system audio 714, camera 716, and eye tracker 718.

During discovery phase 720, orchestrator 251 accesses machine learning engine 181 to establish a baseline volume and microphone gain settings via volume manager 726 and microphone sensing 728 respectively. The baseline volume setting may be augmented based on inputs from sensors and sensor functions embedded in the user device. Such inputs may include, as non-limiting examples, the user's proximity to the user device (via proximity sensing 722), the user's head pose, gaze point, and/or eye position via eye tracker (724).

During a profiling phase (730), attendees are identified and their profiles aggregated by machine learning engine 181 and augmented based on room type 732 and/or facial recognition 734.

In action phase 740, orchestrator 251 controls the volume level of the user's configuration based on a composite of the information provided via the various machine learning engines. In at least one embodiment, the logic employs a "do no harm" approach in conjunction with a composite of the results from the multiple machine learning engines, upon which orchestrator 251 can take an action to control the 'knob' such as the volume for the applicable user.

Although the present disclosure has been described in detail, it should be understood that various changes, substitutions, and alterations can be made hereto without departing from the spirit and the scope of the disclosure as defined by the appended claims.

What is claimed is:

1. An audio control method, comprising:
detecting, by an orchestrator resource associated with a collaboration application, an audio configuration of a near end device associated with a near end participant of a collaboration session wherein the audio configuration includes a near end audio speaker and a near end microphone;
dynamically characterizing one Or more audio parameters associated with one or more far end participants at one or more far end locations; and
dynamically adjusting one or more audio parameters of the near end device during the collaboration session, wherein said adjusting is informed by:
a first output from a first machine learning engine maintaining an audio preference history of the near end participant, wherein the first output is responsive to a first set of one or more indicators sensed by the near end device; and
a second output from a second machine learning engine configured to map profiles of the one or more far end participants at the one or more far end locations against audio preference of the near end participant.

2. The audio control method of claim 1, wherein dynamically adjusting one or more audio parameters comprises dynamically adjusting a gain level of at least one of: the audio speaker and the microphone.

3. The audio control method of claim 1, wherein the audio preference history reflects audio parameter changes initiated by the near end participant during one or more previous collaboration sessions.

4. The audio control method of claim 3, wherein the first machine learning engine collects and analyzes data indicative of the first set of one or more indicators corresponding to one or more of the audio parameter changes initiated by the near end participant.

5. The audio control method of claim 1, wherein the first set of one or more indicators includes a proximity of the near end participant sensed by the near end device.

6. The audio control method of claim 1, wherein the first set of one or more indicators includes at least one eye tracker indicator sensed by an eye tracker of the near end device.

7. The audio control method of claim 6, wherein the at least one eye tracker indicator is selected from: a head pose, a gaze point, and an eye position of the near end participant.

8. The audio control method of claim 1, wherein the second output from the second machine learning engine reflects at least one of: a number of far end participants at a particular far end location and a room type of a particular far end location.

9. The audio control method of claim 1, further comprising: determining identities of the one or more far end participants includes invoking a participant list function exposed by an application program interface (API) of the collaboration application.

10. The audio control method of claim 1, wherein the orchestrator dynamically manages adjustments of the one or more audio parameters based on a composite of the first input from the first machine learning engine and a second input from the second machine learning engine.

11. An information handling system, comprising:
a central processing unit coupled to a memory resource including instructions, executable by the processor, for performing audio control operations, wherein the audio control operations include:
detecting, by an orchestrator resource associated with a collaboration application, an audio configuration of a near end device associated with a near end participant of a collaboration session wherein the audio configuration includes a near end audio speaker and a near end microphone;
dynamically characterizing one or more audio parameters associated with one or more far end participants at one or more far end locations; and
dynamically adjusting one or more audio parameters of the near end device during the collaboration session, wherein said adjusting is informed by:
a first output from a first machine learning engine maintaining an audio preference history of the near end participant, wherein the first output is responsive to a first set of one or more indicators sensed by the near end device; and
a second output from a second machine learning engine configured to map profiles of one or more far end participants at one or more far end locations against audio preference of the near end participant.

12. The information handling system of claim 11, wherein dynamically adjusting one or more audio parameters comprises dynamically adjusting a gain level of at least one of: the audio speaker and the microphone.

13. The information handling system of claim 11, wherein the audio preference history reflects audio parameter changes initiated by the near end participant during one or more previous collaboration sessions.

14. The information handling system of claim 13, wherein the first machine learning engine collects and analyzes data indicative of the first set of one or more indicators corresponding to one or more of the audio parameter changes initiated by the near end participant.

15. The information handling system of claim 11, wherein the first set of one or more indicators includes a proximity of the near end participant sensed by the near end device.

16. The information handling system of claim 11, wherein the first set of one or more indicators includes at least one eye tracker indicator sensed by an eye tracker of the near end device.

17. The information handling system of claim 16, wherein the at least one eye tracker indicator is selected from: a head pose, a gaze point, and an eye position of the near end participant.

18. The information handling system of claim 11, wherein the second output from the second machine learning engine reflects at least one of: a number of far end participants at a particular far end location and a room type of a particular far end location.

19. The information handling system of claim 11, wherein the operations include:
determining identities of the one or more far end participants includes invoking a participant list function exposed by an application program interface (API) of the collaboration application.

20. The information handling system of claim 11, wherein the orchestrator dynamically manages adjustments of the one or more audio parameters based on a composite of the first input from the first machine learning engine and a second input from the second machine learning engine.

* * * * *